Figure 1:
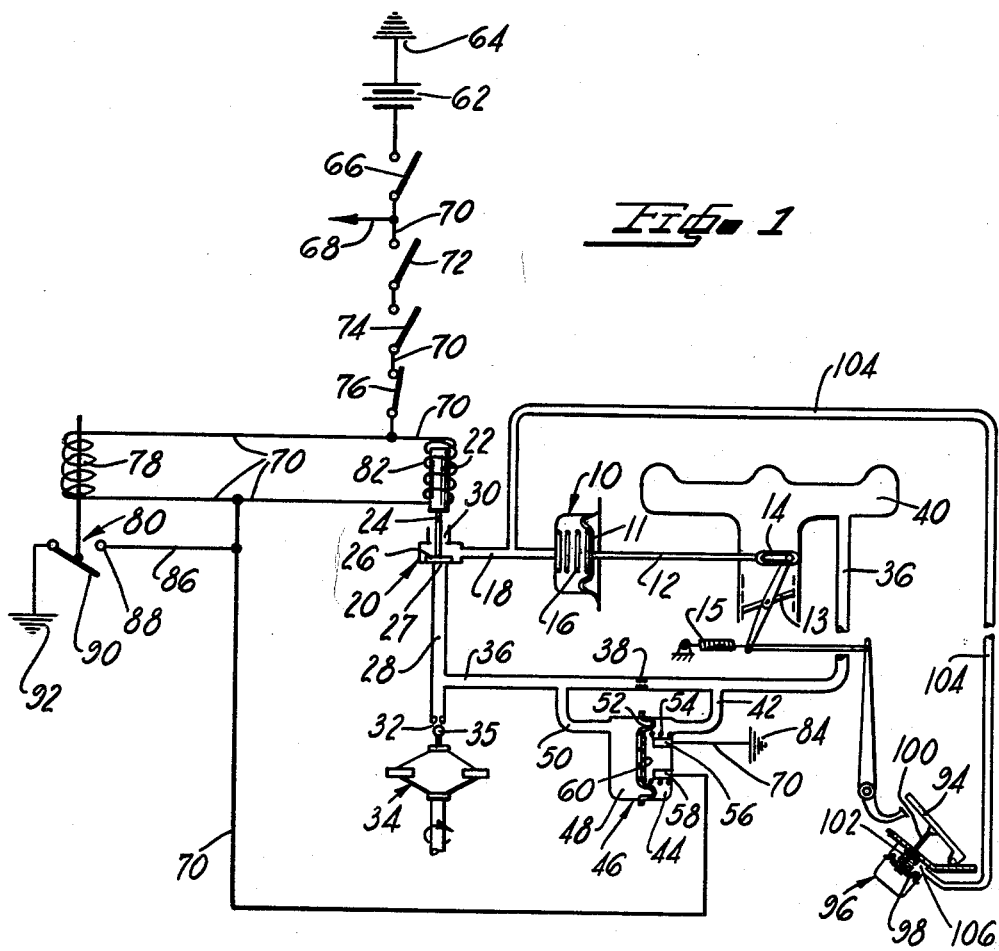

April 13, 1965  F. E. GOERKE ETAL  3,177,968
AUTOMOTIVE CRUISE CONTROL
Filed Dec. 26, 1962

FREDERICK E. GOERKE
ROBERT E. REICHARD
JOHN D. BOHL
INVENTORS

BY
William N. Antonis
ATTORNEY

3,177,968
AUTOMOTIVE CRUISE CONTROL
Frederick E. Goerke, Robert E. Reichard, and John D. Bohl, South Bend, Ind., assignors to The Bendix Corporation, South Bend, Ind., a corporation of Delaware
Filed Dec. 26, 1962, Ser. No. 247,228
7 Claims. (Cl. 180—82.1)

This invention relates to a cruise control system for automatically controlling the speed of an automotive vehicle and more particularly to improvements in a cruise control system of the type disclosed in copending application Serial No. 184,073, filed April 2, 1962, of common ownership (now abandoned).

One of the objects of this invention is to provide in an automotive vehicle having an engine and a throttle control member for controlling the fuel supply to the engine, a driver operated accelerator foot pedal operatively connected to said throttle control member for causing concomitant advancing movement of said member upon advancing movement of said pedal, first fluid pressure means operatively connected to said throttle control member for advancing said member independently of accelerator pedal movement, and second fluid pressure means operatively connected to said accelerator foot pedal for opposing advancing movement of said accelerator pedal but not advancing movement of said throttle control member.

More specifically, it is an object of this invention to provide a vacuum power unit for opposing movement of the accelerator pedal so as to provide a foot rest for the driver when the cruise control system is in operation.

Another object of this invention is to provide an accelerator load cylinder which during cruise control operation will extend itself to contact the accelerator pedal and move it and the driver's foot away from the throttle control linkage.

In other words, it is an object of this invention to provide an accelerator load cylinder which will allow the driver to rest his foot on the accelerator pedal while the cruise control system is functioning without affecting the normal operation thereof. However, in accordance with this invention, the cruise control system can still be overridden, if necessary, by applying a force greater than normal to the accelerator pedal.

Although our invention will be described as being operated by vacuum, which is available in the intake manifold of present day automotive vehicle engines, other pressure fluids which are available in an automotive vehicle may also be utilized. For example, in a vehicle powered by a gas turbine engine, the controlling medium could be compressor pressure rather than manifold vacuum. Accordingly, when the term "fluid pressure" is referred to in the claims, it is intended that such expression be broad enough to cover any suitable fluid pressure which is available in vehicles of this character and to include vacuum.

Figure 2:
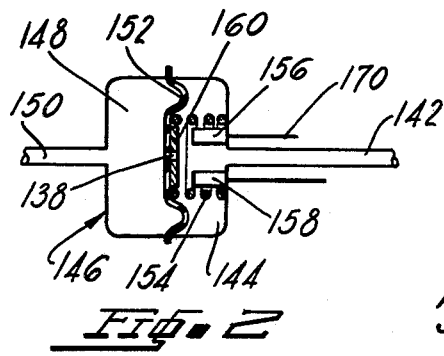

The above and other objects, features, and advantages of the invention will become apparent from the following description taken in connection with the accompanying drawing which forms a part of this invention and in which:

FIGURE 1 shows our speed control system wherein the pneumatic and electrical components thereof are schematically and diagrammatically illustrated; and FIGURE 2 shows an alternate arrangemnet of a differential pressure switch which is utilized in the speed control system.

Referring to FIGURE 1 of the drawing, it will be seen that although the speed control system which is shown is similar in many respects to that which was described in FIGURE 1 of copending application Serial No. 247,227, filed December 21, 1962, of common ownership, it includes adidtional novel features. Specifically, the system consists of a vacuum power unit 10 having a throttle actuator diaphragm 11 therein, which is linked to the engine throttle 13 by rod 12 through a suitable lost motion connection 14. It will be noted that movement of rod 12 to the left will cause the throttle 13 to open and increase the fuel supply to the engine, such movement being against spring 15 which urges the throttle towards a closed position. A spring 16 urges the actuator diaphragm 11 to a throttle release position. The actuator diaphragm 11 has one side thereof continually open to atmosphere while the other side thereof is connected by a conduit 18 to a three-way solenoid valve, indicated generally by the numeral 20. The solenoid valve includes an armature 22 connected to a valve stem 24 on which is mounted a valve head 26. This valve has a vacuum port 27 connected to conduit 28 and an air port 30. Conduit 28 leads to a variable orifice 32 which is controlled by the wheel driven all-speed governor 34, and the modulating valve 35 attached thereto. A conduit 36 branches from conduit 28 and leads through a fixed orifice 38 to the engine intake manifold 40.

Solenoid valve 20 is designed so that when it is de-energized, the valve head 26 closes the vacuum port 27, as shown, and opens air port 30 to conduit 18 and the power unit 10. When the solenoid is energized, the valve head 26 opens the vacuum port 27 and closes air port 30 thereby communicating the power unit 10 with the vacuum from the intake manifold. When the solenoid is de-energized, no pressure differential exists across actuator diaphragm 11 and the spring 16 therefor urges rod 12 to the throttle closed position. At such times, manual operation of the throttle 13 is not impeded due to the lost motion connection on the link. It will be noted that the servo control system comprising fixed orifice 38, conduit 36, conduit 28 and governor variable orifice 32 will remain functional at all times during vehicle operation and the pressure in conduit 28 will be regulated in accordance with the existing governor setting, said governor setting being adjustable in the manner disclosed in copending application Serial No. 184,073. Thus, whenever the vehicle speed is below the governor setting, the variable orifice 32 will be closed by modulating valve 35 and manifold pressure will exist in conduit 28. If the speed of the vehicle increases and passes the governor preset speed setting, modulating valve 35 will move away from the variable orifice 32 and the pressure in conduit 28 will increase (vacuum will decrease) since this conduit will be put into communication with the atmosphere. At some speed slightly above the governor setting, the governor valve will be wide open and the pressure in conduit 28 will approach atmospheric pressure and will be substantially higher than manifold pressure. However, these variations in pressure will not affect the throttle as long as solenoid valve 20 is not energized. When the solenoid valve 20 is energized, it will open vacuum port 27 to the power unit 10 and will close the air port 30. In this condition, the system will regulate the vehicle speed in a manner to be subsequently described.

The control for the previously described pneumatic system includes a conduit 42, one end of which communicates with a chamber 44 of a differential pressure switch 46, and the other end of which communicates with conduit 36 at a point between fixed orifice 38 and the intake manifold 40. The other chamber 48 is connected by a conduit 50 to conduit 36 on the other side of the fixed orifice, namely, between variable orifice 32 and fixed orifice 38. A diaphragm 52 separates the chambers 44 and 48 and is urged by a spring 54 away from electrical switch contacts 56 and 58 which are positoned in the wall of chamber 44 and are adapted to be interconnected by contact with the diaphragm's support plate 60 when a sufficient pressure difference exists across the diaphragm to compress the spring. It will be understood that when the vehicle speed approaches the governor set speed and modulating valve 35 moves away from variable orifice 32, so as to begin to admit air into conduit 28, a pressure difference will be established across fixed orifice 38 sufficient to actuate the pressure switch 46.

It should be understood that, if orifice 38 is placed in plate 60, the differential pressure switch 46 may be placed directly in line 36, as shown in FIGURE 2, wherein like parts are identified by like numerals plus 100.

Referring now to the wiring circuit of the drawing, it will be noted that it includes a battery 62 having one terminal grounded at 64 and having the other terminal connected to an ignition switch 66. Other circuits lead from the ignition switch and are indicated generally by line 68. A cruise control circuit, line 70, also leads from the ignition switch 66 to an "on"–"off" switch 72 located in the driver's compartment and conveniently made a part of the speed setting control so that it will be in an "on" position when the speed selector is moved to any given selected speed position. Circuit 70 continues in series through a shift interlock switch 74 which is open in the park, neutral, and reverse positions, but is closed in the drive position and a brake switch 76 which is normally closed, but is opened upon application of the brakes. Although the shift interlock switch is defined in terms of automatic transmission gear shift settings, it will be understood by those skilled in the art that certain adaptations in the control circuit would permit the use of our invention in an automobile which does not have an automatic transmission.

From the brake switch, circuit 70 branches and passes in parallel through coil 78 of a normally open holding relay switch 80 and the coil 82 of the solenoid valve 20. Circuit 70 continues beyond these coils to contact 58 of the differential pressure switch and thence from contact 56 to ground at 84. A branch circuit 86 leads from circuit 70 to contact 88 of the relay switch and from pole 90 of the relay switch to ground at 92.

Operatively connected to accelerator pedal 94 is a vacuum operated accelerator load cylinder 96 which in conjunction with the accelerator pedal provides a foot rest for the driver when the cruise control system is in operation. Specifically, the accelerator load cylinder includes a diaphragm 98, to which is attached a stop member 100, and a spring 102 which urges the diaphragm and stop member in a direction away from the accelerator pedal 94. A conduit 104 communicates chamber 106 of load cylinder 96 with conduit 18. Since vacuum cannot be communicated to the chamber 106 until solenoid 20 is energized, it will be seen that the stop member 100 will remain in a retracted or inoperable position at all times except when the cruise control system is in operation. Accordingly, solenoid 20, which must be energized before the cruise control system will begin functioning, also simultaneously controls operation of the accelerator load cylinder 96 by communicating vacuum to chamber 106. Such communication of vacuum will cause stop member 100 to extend itself into contact with the accelerator pedal and thereby move the accelerator pedal and the driver's foot away from the throttle control linkage, as shown in the drawing. In this manner, the load cylinder 96 opposes advancing movement of the accelerator pedal without opposing or hindering in any manner the advancing movement of the throttle control member 12. The driver may rest his foot on the accelerator pedal in the usual manner without overriding the cruise control by use of normal foot pressures. However, in the event it is desired to override the cruise control system and exceed the set speed, this may be done by exerting a somewhat greater than normal force against the accelerator pedal in order to overcome the additional counterforce exerted by load cylinder 96. Such additional pedal pressure will bring the accelerator pedal 94 once again into contact with the throttle control linkage and manual operation thereof will be permitted in the usual manner. If the amount of vacuum obtained from conduit 18 is deemed insufficient, vacuum for the load cylinder 96 may be obtained directly from the intake manifold 40 by utilization of a second solenoid valve which will control flow between the intake manifold and the load cylinder, said second solenoid valve being connected in series with solenoid 20 and being operated by the same switches. Operation of this speed control system will be as follows: After a governor speed setting is made and the "on"–"off" switch 72 is closed, the vehicle is set in motion in forward drive, at which time the ignition and interlock switches 66 and 74 are also closed and the vehicle is accelerated under manual control to the set speed, so that the differential pressure switch will operate to close its contact. When this occurs, a circuit is automatically established through the solenoid valve 20 so that it will become energized and thus permit the communication of vacuum from the intake manifold to the power unit 10 via a vacuum port 27 and to chamber 106 of load cylinder 96 via conduit 104. This will create a pressure differential across actuator diaphragm 11 of sufficient magnitude to permit regulation of the throttle and maintenance of a substantially uniform vehicle speed until the circuit is broken and will at the same time cause the stop member 100 to extend into contact with the accelerator pedal 94 and thereby move the pedal and the driver's foot way from the throttle control linkage. The holding relay switch 80 is energized simultaneously and closes contacts 88 and 90 to provide a permanent ground for circuit 70 regardless of what may subsequently happen to the differential pressure switch 46. Thereafter, if at any time the driver operates his brakes or turns off the ignition, or moves the shift control out of forward drive, the relay switch 80 will open and the solenoid valve 20 will shift so as to admit air to the actuator unit 10 and load cylinder 106 thereby permitting closure of the throttle 13 in the conventional manner. If this condition persists for even a brief period of time, the vehicle will decelerate sufficiently below set speed so that the governor modulating valve 35 ill close variable orifice 32 thereby stopping flow of air through the fixed orifice 38 and eliminating the pressure difference across this orifice. When this pressure differential is eliminated, pressure differential switch 46 will open immediately and any subsequent reclosing of the switch (i.e. ignition, brake, or interlock switch) which was opened to initiate this action will have no affect to restore the cruise control to governing condition, and it will be necessary as before to manually accelerate the vehicle to set speed before the differential pressure switch 46 closes once again and automatically locks in the speed control system.

If in ascending a sufficiently steep grade the throttle is opened sufficiently to drop the manifold pressure to the point where it equals the required pressure to operate the throttle actuator 11 at that throttle position, it will be obvious that flow through orifice 38 will cease and the pressure differential switch will open. However, as long as relay switch 80 is closed, the system will remain operative, except that it will be unable to maintain set speed on the hill. Once the grade has been climbed, and the vehicle is on a level road again, it will, of course accelerate to set speed and continue to govern as before. It is, of course, obvious that if the vehicle is on a steep downgrade, the governor valve 32 will open sufficiently to supply nearly atmospheric pressure to the actuator thereby permitting the throttle to close fully. If engine braking at fully closed throttle is not sufficient to hold the vehicle at the set speed, it will overspeed until sufficient engine braking is developed to limit the vehicle's speed.

If the hill is exceedingly steep, it may be necessary for the driver to apply his brakes or shift to "low" gear as he normally would if there were no cruise control. This will open circuit 70 and cause the solenoid valve to shift. But as long as vehicle speed is at or above set speed, release of the brake or shifting back to "drive" will restore operation of the cruise control system. If this is considered undesirable, the driver should either move the "on"-"off" switch to its "off" position or else shift the speed setting unit to its maximum speed which would normally be above the speed at which the vehicle will be operating.

Although this invention has been described in connection with power units which utilize vacuum as a power source, any fluid pressure source may be used which varies as a function of the movement of the throttle control member. Furthermore, even though this invention has been described in connection with a certain specific embodiment, it will be obvious to those skilled in the art that various changes may be made in the form, structure, and arrangement of parts without departing from the spirit of the invention. Accordingly, we do not desire to be limited to the specific embodiment disclosed herein primarily for purposes of illustration, but instead desire protection falling within the scope of the appended claims.

Having thus described the various features of the invention, what we claim as new and desire to secure by Letters Patent is:

1. In an automotive vehicle having an engine and a throttle control member for controlling the fuel supply to the engine, a driver operated accelerator foot pedal operatively connected to said throttle control member for causing concomitant advancing movement of said member upon advancing movement of said pedal, first fluid pressure means operatively connected to said throttle control member for advancing said member independently of accelerator pedal movement, and second fluid pressure means operatively connected to said accelerator foot pedal for opposing advancing movement of said accelerator pedal but not advancing movement of said throttle control member.

2. In an automotive vehicle having an engine and a throttle control member for controlling the fuel supply to the engine, a driver operated accelerator foot pedal operatively connected to said throttle control member for causing concomitant advancing movement of said member upon advancing movement of said pedal, first fluid pressure means operatively connected to said throttle control member for advancing said member independently of accelerator pedal movement, second fluid pressure means operatively connected to said accelerator foot pedal for opposing advancing movement of said accelerator pedal but not advancing movement of said throttle control member, and speed responsive valve means for automatically applying fluid pressure to said first and second fluid pressure means at a predetermined vehicle speed.

3. In an automotive vehicle having an engine and a throttle control member for controlling the fuel supply to the engine, a driver operated accelerator foot pedal operatively connected to said throttle control member for causing concomitant advancing movement of said member upon advancing movement of said pedal, first fluid pressure means operatively connected to said throttle control member for advancing said member independently of accelerator pedal movement, valve means for applying fluid pressure to said first fluid pressure means, means for automatically operating said valve means at a predetermined vehicle speed to apply fluid pressure to said first fluid pressure means, second fluid pressure means operatively connected to said accelerator foot pedal for opposing advancing movement of said accelerator pedal but not advancing movement of said throttle control member, and means for applying fluid pressure to said second fluid pressure means.

4. In an automotive vehicle having an engine and a throttle control member for controlling the fuel supply to the engine, a driver operated accelerator foot pedal operatively connected to said throttle control member for causing concomitant advancing movement of said member upon advancing movement of said pedal, first fluid pressure means operatively connected to said throttle control member for advancing said member independently of accelerator pedal movement, second fluid pressure means operatively connected to said accelerator foot pedal for opposing advancing movement of said accelerator pedal but not advancing movement of said throttle control member, valve means for applying fluid pressure to said first and second fluid pressure means, and speed responsive means for automatically operating said valve means at a predetermined vehicle speed to apply fluid pressure to said first and second fluid pressure means.

5. In an automotive vehicle having an engine and a throttle control member for controlling the fuel supply to the engine, a driver operated accelerator foot pedal operatively connected to said throttle control member for causing concomitant advancing movement of said member upon advancing movement of said pedal, first and second independent vacuum power units each having a pressure responsive element located therein, said pressure responsive element of said first vacuum power unit being operatively connected to said throttle control member for advancing said member independently of accelerator pedal movement and said pressure responsive element of said second vacuum power unit being operatively connected to said accelerator foot pedal for opposing advancing movement of said accelerator pedal but not advancing movement of said throttle control member, passage means for communicating vacuum from the intake manifold of said engine to one side of each of said pressure responsive element, valve means located in said passage means and operatively connected to said vacuum power units, said valve means having a first position for communicating one side of each of said pressure responsive elements with vacuum from the intake manifold and a second position for communicating said one side of each of said pressure responsive elements with atmospheric pressure, and means operatively connected to said valve means for causing movement thereof from one position to the other.

6. The combination defined in claim 5 wherein said last mentioned means is speed responsive and automatically causes movement of said valve means.

7. The combination defined in claim 5 wherein said last mentioned means includes a solenoid for moving said valve means and an electrical circuit having a pressure responsive switch for closing the circuit and energizing the solenoid at a predetermined speed.

References Cited by the Examiner

UNITED STATES PATENTS

| | | | |
|---|---|---|---|
| 2,157,472 | 5/39 | Bellis | 180—82.1 X |
| 2,519,859 | 8/50 | Teetor | 180—82.1 |
| 2,809,708 | 10/57 | Edwards | 180—82.1 |
| 2,990,825 | 7/61 | Fuller et al. | 180—82.1 |
| 3,072,210 | 1/63 | Cramer | 180—82.1 |
| 3,081,837 | 3/63 | Fiteny | 180—82.1 |
| 3,092,090 | 6/63 | Berninger | 180—82.1 |

A. HARRY LEVY, *Primary Examiner.*